United States Patent [15] 3,692,315
Goulding [45] Sept. 19, 1972

[54] UMBRELLA SPINDLES FOR AUTOMATIC DISC CHANGING PHONOGRAPHS

[72] Inventor: Kenneth Charles Goulding, Plymouth, England

[73] Assignee: The Magnavox Electronics Company Limited, Barking, Essex, England

[22] Filed: March 17, 1971

[21] Appl. No.: 125,228

[30] Foreign Application Priority Data

March 17, 1970 Great Britain...........12852/70

[52] U.S. Cl...................................................274/10 S
[51] Int. Cl...............................................G11b 17/04
[58] Field of Search......................................274/10 S

[56] References Cited

UNITED STATES PATENTS

| | | | |
|---|---|---|---|
| 3,046,021 | 7/1962 | Perge | 274/10 S |
| 3,081,093 | 3/1963 | Tiedtke | 274/10 S |
| 3,279,797 | 10/1966 | Goulding | 274/10 S |

*Primary Examiner*—Leonard Forman
*Assistant Examiner*—Charles E. Phillips
*Attorney*—Holcombe, Wetherill & Brisebois

[57] ABSTRACT

A spindle of the umbrella type for use in an automatic disc changing phonograph has a number of main record support pawls spaced angularly around the spindle axis and movable between record supporting positions in which they project upwards and outwards through slots in the spindle casing and record release positions in which they are retracted downwards and inwards in response to movement of an upwardly and downwardly movable push rod within the casing. In operation the push rod is moved by the change cycle mechanism of the phonograph. The spindle also includes a number of secondary support pawls which are actuated as the main support pawls are moved downwards towards their release position so as to engage and support records above the lower most record in a stack on the spindle. Thus, when the main support pawls reach their record release positions the lower most record alone is allowed to fall down the spindle, the rest of the stack remaining supported on the secondary support pawls. In order to detect when no further records remain on the spindle so that the change cycle mechanism can be caused to stop after playing of the last record is complete, the spindle is provided with a record sensing finger which is movable downwards with the main support pawls and is biased so that during a part of the downward movement it projects through a slot in the casing at a level immediately above that of the tops of the main support pawls whereby, in use, it engages the edge of the central hole of the lower most record in the stack to restrict its outward projection, but which on downward movement of the main support pawls when there are no records remaining supported on the spindle projects further from the slot into a position in which it engages a fixed part of the spindle and prevents further downward movement on the support pawls and their inward retraction, thus preventing the full cycle of operations of the spindle from taking place.

11 Claims, 11 Drawing Figures

UMBRELLA SPINDLES FOR AUTOMATIC DISC CHANGING PHONOGRAPHS

This invention relates to automatic record changers for playing disc records of the kind in which a stack of the records to be played is supported on a magazine spindle which projects upwards from the center of a turntable. A change cycle mechanism brings about a cycle of operations in which first of all the spindle is caused to drop the lowermost record in the stack onto the turntable, a tone arm with a pick-up cartridge is moved inwards and placed on the edge of the record, and then after playing of the record is completed, the tone arm is lifted and moved outwards ready for the cycle of operations to be repeated. A sensing device is provided which senses the absence of records remaining on the spindle after the last record has been dropped onto the turntable and this sensing device actuates a mechanism which causes the change cycle mechanism to stop after the last record has been played.

There are two different kinds of magazine spindle which may be used in such automatic record changers, the most common having an offset portion at the top of the spindle with a step at the junction between the lower portion and the offset top portion. The stack of records is supported on this step and the records are pushed off the step one at a time from the bottom of the stack, whence they fall onto the turntable. Because of the limited extent of the step, a balance arm is necessary to engage with the top of the stack and hold the stack horizontal, and with stepped magazine spindles of this kind, it is usual for the balance arm to be used as the sensing device for sensing the absence of records on the spindle. When the last record is dropped from the step, the balance arm falls below the step and this downward movement of the balance arm sets the mechanism which subsequently stops the change cycle mechanism when the tone arm has been swung outwards after playing of the last record.

The other form of spindle is known as an umbrella spindle and it is this kind of spindle with which the present invention is particularly concerned. Umbrella spindles include a number of main record support pawls which are angularly spaced around the spindle and project upwards and outwards from the spindle, like the supporting struts of the canopy of an umbrella and hence the name, and these pawls support the stack of records on their upper ends. Because the records thus have a number of points of support spaced around the spindle, the stack of records is supported horizontally without any necessity for a balance arm and this cannot therefore be used as the device for sensing the absence of records on the spindle.

The sensing of the absence of records and the subsequent stopping of the change cycle mechanism therefore gives rise to difficulty and one of the aims of the present invention is to provide means within the spindle itself for sensing the absence of records on the spindle in a way which enables the mechanism to be actuated to stop the change cycle mechanism.

The invention is applied to an umbrella spindle having a tubular casing which contains an upwardly and downwardly movable push rod, a number of main record support pawls which are spaced angularly around the spindle axis and are movable in response to movement of the push rod between record supporting positions in which they project upwards and outwards through slots in the casing and record release positions in which they are retracted downwards and inwards, a number of secondary support pawls which are arranged above the main support pawls and which, in use, are retracted within the casing when the main support pawls are in their record supporting positions, but are caused to project from slots in the casing to support records above the lowermost record in the stack as the main support pawls are moved downwards by the push rod and before the main support pawls are retracted inwards so that when the main support pawls are subsequently retracted inwards, the lowermost record alone is allowed to fall down the spindle and the remainder of the stack remains supported on the secondary support pawls.

According to the invention, such an umbrella spindle is provided with a record sensing finger which is movable downwards with the main support pawls and is biased so that during a part of the downward movement it projects through a slot in the casing at a level immediately above that of the tops of the main support pawls so that, in use, it engages the edge of the central hole of the lowermost record in the stack to restrict its outward projection, but which on downward movement of the main support pawls when there are no records remaining supported on the spindle projects further from the slot into a position in which it engages with a fixed part of the spindle and prevents further downward movement of the main support pawls and their inward retraction, thus preventing the full cycle of operations of the spindle from taking place.

It is a simple matter to arrange for this incomplete cycle of spindle operations to cause a mechanism subsequently to stop the change cycle mechanism. Conveniently the change cycle mechanism itself is provided with sensing means which responds to the restriction of the downward movement of the main support pawls and of the parts attached to them and sets the mechanism which subsequently stops the change cycle mechanism. The sensing means can be incorporated in the change cycle mechanism itself below a base plate which supports the turntable and the remainder of the mechanism of the record changer and no external feeling device mounted on the record changer for directly sensing the presence or absence of records on the spindle, similar to a balance arm, is necessary.

Preferably, both the main support pawls and the sensing finger are pivotally connected to the upwardly and downwardly movable push rod and are acted upon by a spring which acts between their lower ends and the push rod to bias the outer ends of both the main support pawls and the sensing finger outwards through their slots in the casing, the push rod itself being acted upon by a further spring which biases downwards the push rod and the parts connected to it, i.e., biasing the main support pawls into their downwardly and inwardly retracted record release positions. In this case, when the spindle is fitted in an automatic record changer, the lower end of the push rod is urged into contact with a drive which forms part of the change cycle mechanism and which reciprocates the push rod upwards and downwards, and the sensing means may be arranged to respond if the push rod becomes disengaged from the drive as will happen when the finger engages the fixed part of the spindle to prevent further downward movement of the main support pawls and the push rod.

Preferably, the fixed part of the spindle with which the sensing finger engages is the bottom edge of the slot in the tubular casing through which the sensing finger is biased to project. For this purpose the sensing finger is preferably provided with a cam surface inclined to the axis of the spindle and an abutment surface substantially at right angles to this axis. When the sensing finger projects only slightly through the slot to the extent necessary to engage the edge of the central hole in the lowermost record, the inclined cam surface comes into engagement with the bottom edge of the slot as the sensing finger moves downwards together with the main support pawls and the bottom edge of the slot forces the finger inwards to release it from the slot and allow the downward movement of the finger and of the other parts to continue. However, when there is no record on the spindle, the sensing finger is allowed to project further from the slot and as the finger and the main support pawls are moved downwards the abutment surface comes into engagement with the bottom edge of the slot. Since this surface is substantially at right angles to the axis of the spindle, further downward movement of the sensing finger and of the main support pawls is prevented.

When the main support pawls are in their uppermost record supporting position it is important that the sensing finger should not project from its slot where it could interfere with the loading of records onto the spindle or with the resetting of the spindle parts after the lowermost record of a stack has been dropped on to the turntable. For this purpose, the sensing finger may be provided with a cam nose which engages with the inside surface of the wall of the casing below the slot through which the finger is biased to project to retract the finger into the slot when the main support pawls are in their uppermost record supporting positions, and which on downward movement of the push rod moves out of engagement with the wall of the casing into a further slot to allow the biasing of the sensing finger to urge the finger through the slot. As explained earlier, if there are records supported on the spindle, the finger then engages the edge of the central hole of the lowermost record, and remains in engagement with the edge as the record is lowered on downward movement of the main support pawls until the inclined cam surface on the sensing finger engages the lower edge of its slot and withdraws the sensing finger into the casing so that on subsequent retraction of the main support pawls the record is allowed to fall freely on to the turntable. On subsequent upward movement of the push rod to return the main support pawls to their initial position, the sensing finger is allowed to project fully from its slot, but the cam nose moving back in to engagement with the wall of the casing below the sensing finger slot retracts the sensing finger into the slot where it moves into a position adjacent the edge of the central hole of the new lowermost record on the spindle.

The secondary supporting pawls may be pivotally mounted in the part which is slidable upwards and downwards within the casing above the push rod and which is biased downwards by a spring acting between the part and the top end of the casing. In the uppermost record supporting positions of the main support pawls the push rod engages the lower end of the slidable part and holds it near the top of the casing against the action of the spring which biases the slidable part. In this position the secondary support pawls are retracted into the casing, preferably by means of cam surfaces of the secondary support pawls which engage with the top edges of their slots in the casing. The secondary support pawls may have sharp noses which are capable of being pushed in between the lowermost record in the stack and the records above it so that the records above remain supported on the noses when the lowermost record is released, and in the retracted position of the secondary support pawls these noses are at a level which is within the edge of the central hole of the lowermost record in the stack. As downward movement of the push rod, together with the main support pawls and the sensing finger starts, the sliding part with the secondary support pawls also moves downwards and releases the cam surfaces from engagement with the top edges of the slots. However, this movement preferably brings further cam surfaces on the secondary support pawls into engagement with the bottom edges of further slots near the top of the casing. This engagement forces the bottom ends of the secondary support pawls outwards until the noses engage the edge of the central hole in the lowermost record. Further movement of the sliding part is then prevented until the records have moved down the spindle sufficiently to bring the gap between the lowermost record and the rest of the stack into registry with the noses of the secondary support pawls. At this stage the sliding part is moved downwards by its spring bias and the further cam surfaces on the secondary support pawls move over the bottom edges of the of the further slots and cause the noses to move outwards and into the gap between the records. The sliding part then continues to move downwards with the push rod until the secondary support pawls are stopped by contact with the bottom edges of their slots. The push rod continues to move downwards carrying the lowermost record on the main support pawls, while the remainder of the stack of records remains supported on the secondary support pawls until lifted off by the main support pawls when the push rod next moves upwards and back to its initial position.

An example of an umbrella spindle constructed in accordance with the invention is illustrated in the accompanying drawings in which.

Figures 1, 2, 3:
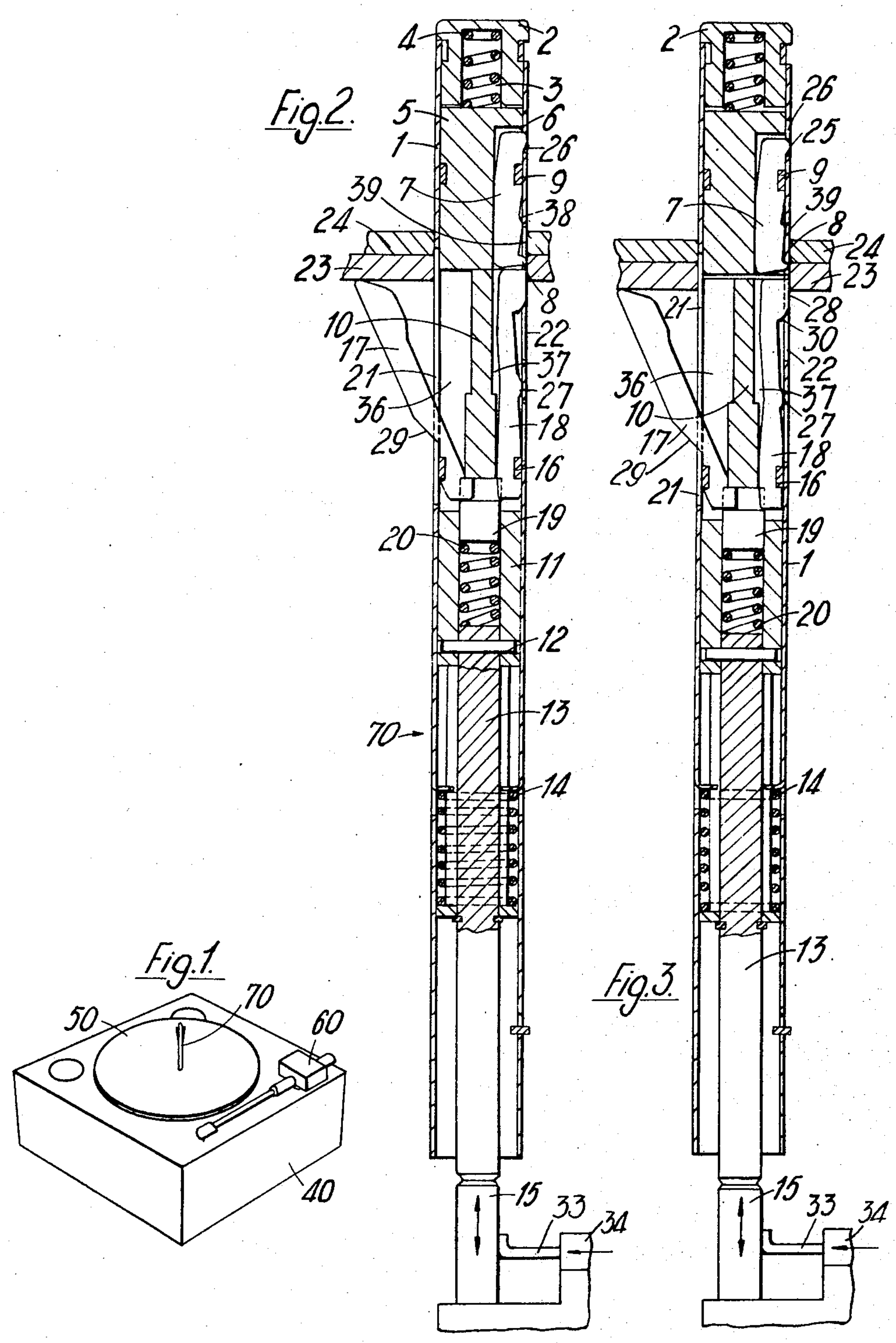
FIG. 1 is a perspective diagrammatic view of an automatic record changer incorporating the spindle.
FIGS. 2 to 6 are longitudinal sections through the spindle showing the parts in the positions which they adopt at different stages of the cycle of operations of the spindle.

The automatic record changer shown in FIG. 1 comprises a box housing 40 which supports a turntable 50 and a tone arm 60. The turntable 50 is rotated about a central spindle 70 in accordance with the present invention by a motor (not shown) which is mounted within the box housing 40. Also mounted within the housing 40 and operatively connected to the central spindle 70 is a change cycle mechanism 80 which is shown diagrammatically in block form in FIGS. 2 to 6.

The spindle 70 has a tubular casing 1 having its upper end closed by a plug 2 with a bore 3 containing a coiled compression spring 4. The spring 4 acts on a support pawl cage 5 which has three longitudinally extending grooves 6 in its periphery arranged at equal 120° angular intervals. In each of the grooves 6 there is a secondary support pawl 7 having an outwardly directed supporting nose 8 at its lower end. The secondary support pawls 7 can rock through a limited angle on a ring 9 which is fixed to the cage 5. The cage 5 is movable downwards by the spring 4 to the position shown in FIGS. 5 to 7, and upwards against the action of the spring 4 t o the position shown in FIG. 2 by an upper push rod part 10.

The upper push rod part 10 has a tubular lower part 11 which is fixed by a pin 12 to a lower push rod part 13. The two push rod parts 10 and 13 together form a rigid push rod which is movable upwards and downwards within the casing 1, and which is biased downwards by a spring 14 which acts between a fixed part on the casing and a flange mounted on the lower push rod part 13. When the spindle is mounted in the automatic record changer shown in FIG. 1, the lower end of the push rod 10, 13 engages an operating rod 15 which forms part of the change cycle mechanism 80 and which is reciprocable in the direction of the spindle axis to cause the push rod to move upwards and downwards within the casing 1.

The upper push rod part 10 has three longitudinally extending grooves 36 spaced at equal 120° intervals in its periphery above the tubular lower portion 11. In each of the grooves 36 there is a main record support pawl 17 which is pivotally mounted on a ring 16 which is fixed around the part 10 near the lower ends of the grooves 36. A further longitudinally extending groove 37 is located in the upper push rod part 10 between two of the grooves 36, and the groove 37 contains a sensing finger 18 which is also pivotally mounted on the ring 16. The bases of the grooves 36 and 37 at their lower ends open into the bore within the tubular portion 11, and a plunger 19 which is mounted within this bore is urged upwards into engagement with the lower ends of the main support pawls 17 and the sensing finger 18 by a coiled compression spring 20. The action of the plunger 19 on the lower ends of the pawls 17 and the finger 18 biases their upper ends in outward directions from the grooves 36 and 37.

FIG. 2 shows the parts of the spindle in the positions which they occupy when the spindle is ready to receive a stack of records 23, 24, and also between successive record change cycles. The main record support pawls 17 project upwards and outwards through slots 21 in the casing 1 under the bias of the plunger 19. The upper end of the sensing finger 18 is prevented from projecting in a similar fashion through a slot 22 in the casing 1 by means of a cam nose 27 which engages the inner wall of the casing 1 below the slot 22. In this position a stack of records is supported on the upper ends of the main support pawls 17 and the top of the sensing finger 18 is restrained within the slot 22 adjacent the wall of the central hole of the lowermost record 23 in the stack. The secondary support pawls 7 are also retracted into their grooves 6 to that the noses 8 are also adjacent the wall of the central hole in the lowermost record 23, the retraction being effected by means of a cam surface 38 on each pawl 7 engaging with the top edge of a corresponding slot 39 in the casing 1. In the example shown one of the pawls 7 is in line with the sensing finger 18 and their respective slots 22 and 39 are continuous. All the parts are maintained in this position against the action of the push rod spring 14 by the operating rod 15 of the change cycle mechanism 80.

To release the lowermost record 23 on to the turntable the operating rod 15 is moved by the change cycle mechanism downwards. The push rod 10, 13 is caused to follow this downward movement of the operating rod 15 by the action of the spring 14, and the parts undergo the changes of position shown in FIGS. 3 to 5 to cause the lowermost record 23 to drop down the spindle on to the turntable while leaving the remainder of the stack of records still supported on the spindle.

As the push rod 10, 13 moves downwards from the position shown in FIG. 2, the records are lowered also, and the secondary support pawl cage 5 follows the downward movement under the action of its spring 4 until, as shown in FIG. 2, the cam surfaces 38 of the pawls 7 are lowered a little with respect to the top edges of the slots 39, and further cam surfaces 25 at the upper ends of the pawls 7 are brought into engagement with the lower edges of further slots 26 in the casing 1. The noses 8 are thus cammed outwards into engagement with the wall of the central hole in the lowermost record 23 and further downward movement of the cage 5 is temporarily prevented. Downward movement of the push rod continues, a small gap opening between the upper end of the push rod part 10 and the cage 5, and the lowermost record 23 slides completely past the noses 8 at which time the outward restriction on the noses 8 is released and the spring 4 urges the cage 5 downwards causing the cam surfaces 25 to ride over the bottom edges of the slots 26 and the noses 8 to move outwards and under the record 24 to separate the lowermost record 23 from the remainder of the stack.

Figure 4:
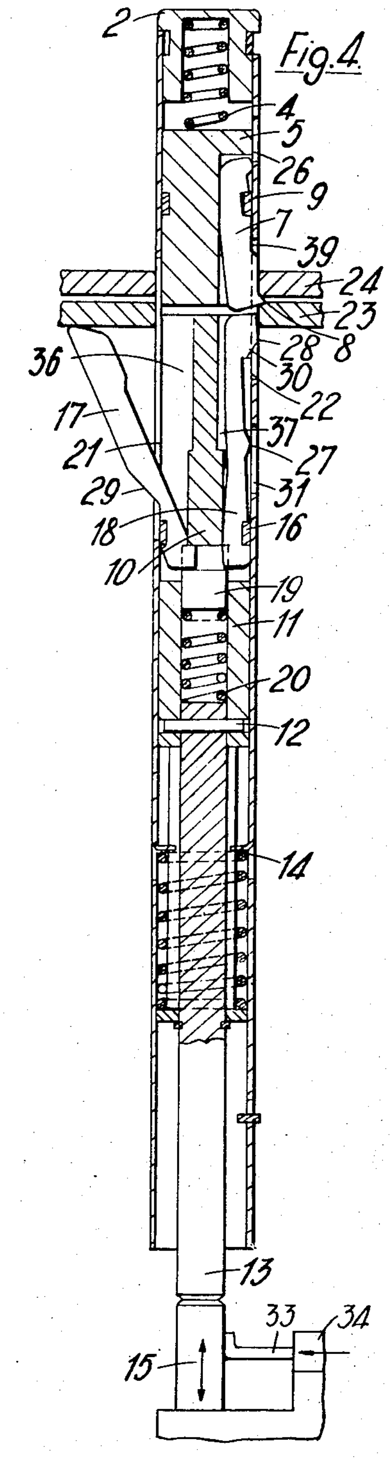
Figure 5:
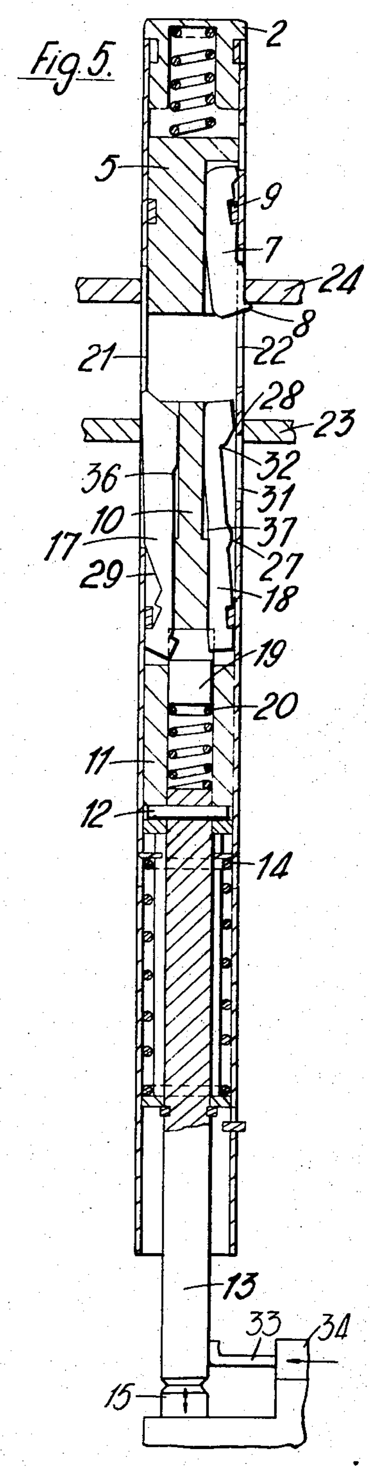

Downward movement of all the parts then continues until the position shown in FIG. 4 is reached. At this stage further downward movement of the cage 5 and the secondary support pawls 7 is prevented by the lower ends of the pawls 7 abutting the lower edges of their slots 39 (shown more clearly in FIG. 7). The record 24 and any further records in the stack are thus retained in this position on the spindle, supported by the noses 8 of the secondary support pawls 7. FIG. 4 also shown that the cam nose 27 on the sensing finger 18 has moved out of engagement with the wall of the casing 1 and lies adjacent a further slot 31 in the casing 1. Thus, the action of the plunger 19 against the lower end of the sensing finger 18 urges the upper end 28 of the sensing finger against the wall of the central hole of the record 23, which at this time is the only means preventing the upper end 28 from projecting completely through its slot 22. Continued downward movement of the push rod brings an inclined cam surface 30 at the upper end 28 of the finger 18 into engagement with the lower edge of the slot 22 which thus forces the sensing finger 18 out of engagement with the record 23 and into the casing. Also during this part of the downward movement, inclined cam surfaces 29 on the main record support pawls 17 are brought into engagement with the lower edges of their slots 21 to force the pawls 17 inwards into the casing as shown in FIG. 5. This releases all support for the record 23 which then slides freely down the spindle on to the turntable. Subsequent upward movement of the operating rod 15 and hence of the push rod 10, 13 restores the parts to the position shown in FIG. 2, except that the record 24 has now become the lowermost record.

Figure 6:
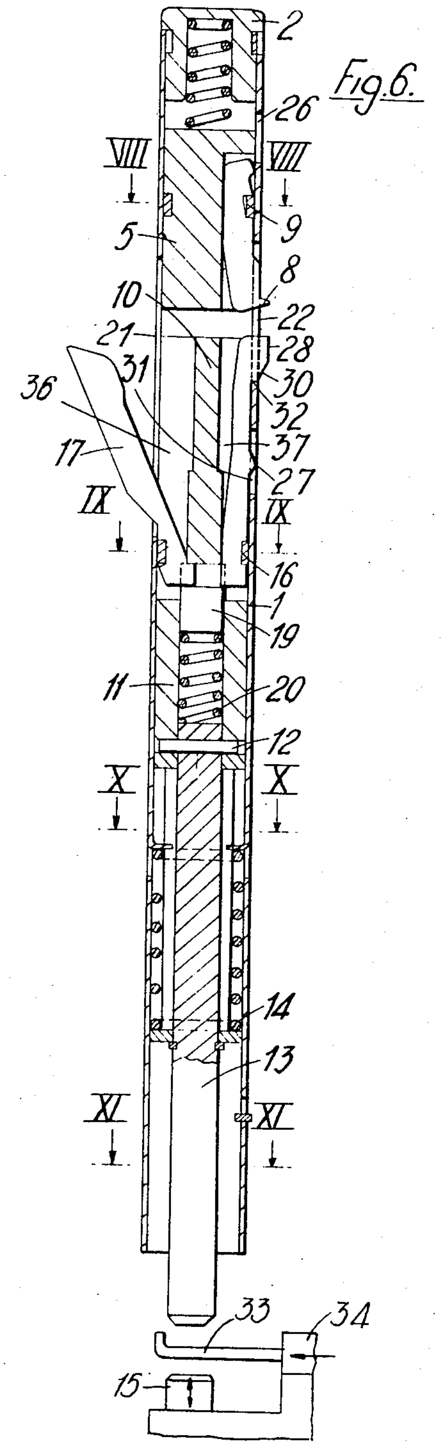
Figure 7:
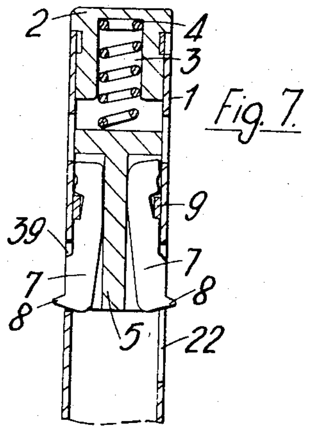
FIG. 7 is a longitudinal section on a different plane through the top part of the spindle at the same stage of the cycle of operations as FIG. 4.
Figure 8:
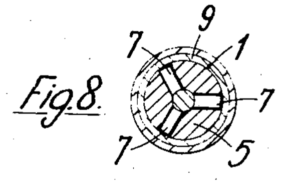
FIGS. 8 to 11 are cross-sections of the spindle as seen along the arrows on the lines VIII — VIII, IX — IX, X — X and XI — XI respectively in FIG. 6.
Figure 9:
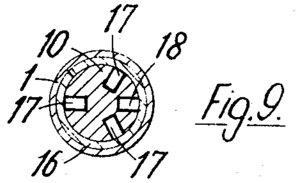
Figure 10:
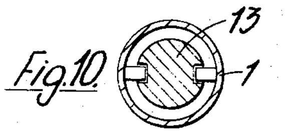
Figure 11:
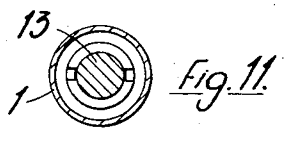

When, however, there are no records remaining to be supported on the main support pawls 17, on subsequent downward movement of the operating rod 15 to initiate a record change cycle, the cam nose 27 of the sensing finger 18 is moved out of engagement with the casing wall below the slot 22, and since there is no record adjacent the upper end 28 of the finger this end springs outwards through its slot 22 to bring an abutment surface 32 above the lower edge of the slot 22. Thus abutment surface 32 is substantially at right angles to the axis of the spindle and thus, when it engages the lower edge of the slot 22 as shown in FIG. 6, further downward movement of the finger 18 and hence the pawls 17 and push rod 10, 13 is prevented. The operating rod 15 however continues to move downwards and the push rod 10, 13 therefore become separated from the operating rod 15. This separation is sensed by a member 33 which is able to move inwards through the gap which opens up between the push rod 10, 13 and the operating rod 15 (FIG. 6), whereas previously this member was prevented from moving inwards by engagement with either the operating rod 15 or the push rod 13 (See FIGS. 2 to 5). The member 33 is part of a mechanism 34 which is connected to the change cycle mechanism 80, and inward movement of the member 33 triggers the mechanism 34 to cause the change cycle mechanism to be stopped as soon as the operating rod 15 has moved upwards again to move the push rod 10, 13 and the parts connected to it upwards back into the position shown in FIG. 2 ready to receive a new stack of records when the record changer is next used.

I claim:

1. An umbrella spindle comprising a tubular casing having a number of sets of slots, an upwardly and downwardly movable push rod within said casing, a plurality of main record support pawls mounted in said casing at angularly spaced locations around said casing, means for causing said main support pawls to move in response to movement of said push rod between record supporting positions wherein said main support pawls project upwards and outwards through a first set of said sets of slots and record release positions wherein said main support pawls are retracted downwards and inwards into said casing, a plurality of secondary support pawls mounted in said casing at locations above said main support pawls, means for holding said secondary support pawls within said casing when said main support pawls are in said record supporting positions, means for causing said secondary support pawls to project from a second set of said sets of slots as said main support pawls are moved downwards by said push rod and before said main support pawls are retracted inwards into said casing, whereby in operation said secondary support pawls support records above the lowermost record in a stack located on said spindle as said main support pawls are moved downwards so that when said main support pawls are subsequently retracted inwards said lowermost record along is allowed to fall down said spindle and the rest of said stack remains supported on said secondary support pawls, a record sensing finger, means mounting said sensing finger in said casing for downward movement with said main support pawls, means for biasing said sensing finger so that during a part of said downward movement said sensing finger projects through a first additional slot at a level immediately above that of the tops of said main support pawls whereby in operation said sensing finger engages the edge of the central hole of said lowermost record in said stack to restrict outward projection of said sensing finger through said first additional slot, but on downward movement of said main support pawls and said sensing finger when there are no records remaining supported on said spindle said sensing finger projects further out of said first additional slot, and fixed means on said casing which is engaged by said sensing finger when said sensing finger projects further out of said first additional slot whereby further downward movement of said sensing finger and said main support pawls and subsequent inward retraction of said main support pawls is prevented, thus preventing the full cycle of operations of said spindle from taking place.

2. A spindle in accordance with claim 1, wherein said means for mounting said main support pawls and said sensing finger in said casing includes means pivotally connecting said main support pawls and said sensing finger to said push rod, and said spindle includes a spring which biases downwards said push rod.

3. A spindle in accordance with claim 2, wherein a second spring acts between said push rod and both said main support pawls and said sensing finger to bias them outwards through their respective slots.

4. A spindle in accordance with claim 1, wherein said fixed means which is engaged by said sensing finger when said sensing finger projects further from said first additional slot is the bottom edge of said first additional slot in said tubular casing.

5. A spindle in accordance with claim 4, wherein the part of said sensing finger which is caused to project through said first additional slot is provided with a cam surface inclined to the axis of said spindle and an abutment surface substantially at right angles to said axis.

6. A spindle in accordance with claim 1, wherein said sensing finger is provided with a cam nose and said casing has an inside wall face below said first additional slot, said cam nose engaging with said inside wall face to hold said sensing finger in said first additional slot when said main support pawls are in said uppermost record supporting positions, and said cam nose moving out of engagement with said inside wall face into a second additional slot during downward movement of said main support pawls to allow said sensing finger to project from said first additional slot.

7. A spindle in accordance with claim 1, wherein said main record support pawls are each provided with an inclined cam surface and the slots of said first set have bottom edges which engage said inclined cam surfaces on downward movement of said main support pawls to retract said pawls inwards to their record release positions.

8. A spindle according to claim 1, including a member which is slidable upwards and downwards within said casing above said push rod, means pivotably mounting said secondary support pawls to said member, and a third spring acting between said member and said casing to bias said member downwards, said member being held by said push rod in an upper position against the bias of said third spring when said main support pawls are in their uppermost record supporting position.

9. A spindle in accordance with claim 8, wherein each of said secondary support pawls is provided with a first and a second cam surface and also with a nose adapted for pushing in between the lowermost record of a stack and the records above said lowermost record so that said records above remain supported on said noses when said lowermost record is released, and said casing provides a top edge to each of the slots of said second set, bottom edge to each of a third, set of said sets of slots, the said first cam surfaces on said secondary support pawls engaging with said top edges of the slots of said second set when said main support pawls are in their uppermost record supporting positions to hole said secondary support pawls within the slots of said second set adjacent said lowermost record in the stack, and said first cam surfaces being released on downward movement of said push rod and the said nose being forced into engagement with the edge of the hole in said lowermost record by means of said second cam surfaces on said secondary support pawls engaging with said bottom edges of said fifth slots, further downward movement of said push rod bringing the gap between said lowermost record and said records above opposite said noses which are then forced outwards into said gap.

10. An automatic disc changing phonograph including a spindle in accordance with claim 1, a change cycle mechanism having means for reciprocating said push rod upwards and downwards, sensing means responsive to restriction of the downward movement of said sensing finger and said main support pawls, and a mechanism adapted to stop said change cycle mechanism subsequent to actuation of said sensing means.

11. An automatic disc changing phonograph including a spindle in accordance with claim 2, a change cycle mechanism having an operating rod aligned axially with said push rod of said spindle and with an upper end adjacent the lower end of said push rod, said push rod being biased downwards into contact with said operating rod, and means for reciprocating said operating rod and hence said push rod upwards and downwards, sensing means responsive to the restriction of the downward movement of said sensing finger and main support pawls and comprising a sensor member and means biasing said sensor member against the side of either of said push rod and said operating rod, whereby said sensor member is held in an inoperative position as said push rod and said operating rod reciprocate during normal operation of said phonograph and said sensor member moves to an operative position when said push rod becomes disengaged from said operating rod as happens when the downward movement of said sensing finger and main support pawls and hence said push rod is interrupted, and a mechanism operative in response to movement of said sensor member to its operative position subsequently to stop said change cycle mechanism.

* * * * *